(12) United States Patent
Wang et al.

(10) Patent No.: US 11,358,468 B2
(45) Date of Patent: Jun. 14, 2022

(54) TWO-SPEED TRANSMISSION SYSTEM INTEGRATED WITH INNER ROTOR HUB MOTOR AND ELECTRIC VEHICLE USING SAME

(71) Applicant: Jilin University, Jilin (CN)

(72) Inventors: Junnian Wang, Jilin (CN); Kai Wang, Jilin (CN); Dachang Guo, Jilin (CN); Chunlin Zhang, Jilin (CN); Rui Luo, Jilin (CN); Zhenhao Zhang, Jilin (CN); Jiulong Gao, Jilin (CN); Jiantu Ni, Jilin (CN)

(73) Assignee: Jilin University, Changchun (CN)

( * ) Notice: Subject to any disclaimer, the term of this patent is extended or adjusted under 35 U.S.C. 154(b) by 410 days.

(21) Appl. No.: 16/706,641

(22) Filed: Dec. 6, 2019

(65) Prior Publication Data

US 2020/0384856 A1    Dec. 10, 2020

(30) Foreign Application Priority Data

Jun. 5, 2019    (CN) .......................... 201910487833.8

(51) Int. Cl.
*B60K 17/04*    (2006.01)
*F16D 63/00*    (2006.01)
(Continued)

(52) U.S. Cl.
CPC .......... *B60K 17/046* (2013.01); *B60K 7/0007* (2013.01); *F16H 3/64* (2013.01); *F16H 57/033* (2013.01); *F16H 61/0204* (2013.01); *F16H 61/686* (2013.01); *H02K 7/006* (2013.01); *H02K 7/1025* (2013.01); *H02K 7/116* (2013.01); *B60K 2007/0092* (2013.01); *B60T 1/065* (2013.01); *B62D 7/18* (2013.01); *F16H 2057/02034* (2013.01); *F16H 2057/02043* (2013.01); *F16H 2200/0021* (2013.01);

(Continued)

(58) Field of Classification Search
CPC ............ B60K 17/00–36; B60K 17/046; F16D 63/002
See application file for complete search history.

(56) References Cited

U.S. PATENT DOCUMENTS

2016/0111937 A1* 4/2016 Chou ..................... H02K 7/102
                                                                310/67 R
2020/0141477 A1* 5/2020 Sullivan .................. F16H 48/36

FOREIGN PATENT DOCUMENTS

CN        108501716 A    9/2018
CN        108512381 A    9/2018
(Continued)

*Primary Examiner* — Ernesto A Suarez
*Assistant Examiner* — Lillian T Nguyen

(57) ABSTRACT

A two-speed transmission system integrated with an inner rotor hub motor, including an inner rotor hub motor, a steering knuckle, a fastening screw, a first transmission casing, a second transmission casing, a screw, a first planetary gear train, a second planetary gear train, a first electromagnetic brake, a second electromagnetic brake, a tire, a wheel rim, a rim bolt, a rim nut, a wheel hub, a shaft end bolt, a brake disc and a brake caliper. This invention also provides an electric vehicle, which balances the requirements for dynamics performance and driving economics and achieves better overall performances. The two-speed transmission system of this invention realizes gear shifting and long-term no-power parking braking.

10 Claims, 4 Drawing Sheets

(51) Int. Cl.
*B60K 7/00* (2006.01)
*F16H 3/64* (2006.01)
*F16H 57/033* (2012.01)
*F16H 61/02* (2006.01)
*F16H 61/686* (2006.01)
*H02K 7/00* (2006.01)
*H02K 7/102* (2006.01)
*H02K 7/116* (2006.01)
*B60T 1/06* (2006.01)
*B62D 7/18* (2006.01)
*F16H 57/02* (2012.01)

(52) U.S. Cl.
CPC ............... *F16H 2200/0034* (2013.01); *F16H 2200/2007* (2013.01); *F16H 2200/2035* (2013.01)

(56) References Cited

FOREIGN PATENT DOCUMENTS

| | | | |
|---|---|---|---|
| CN | 208544105 U | | 2/2019 |
| CN | 109398069 A | * | 3/2019 |
| CN | 109572388 A | | 4/2019 |
| CN | 110067837 A | * | 7/2019 |

* cited by examiner

TWO-SPEED TRANSMISSION SYSTEM INTEGRATED WITH INNER ROTOR HUB MOTOR AND ELECTRIC VEHICLE USING SAME

CROSS-REFERENCE TO RELATED APPLICATIONS

This application claims the benefit of priority from Chinese Patent Application No. 201910487833.8, filed on Jun. 5, 2019. The content of the aforementioned application, including any intervening amendments thereto, is incorporated herein by reference in its entirety.

TECHNICAL FIELD

The application relates to electric vehicles, and more particularly to a two-speed transmission system integrated with an inner rotor hub motor and an electric vehicle using the same.

BACKGROUND OF THE INVENTION

The rapid development of the automotive industry has greatly changed our living style and improved our living quality. Though automobiles provide a lot of conveniences, they also lead to numerous negative effects. For example, a large number of non-renewable resources such as oil and natural gas are consumed, which results in the generation of a considerable number of toxic and harmful gases such as carbon monoxide and nitrogen oxides and greenhouse gases such as carbon dioxide together with a lot of noise, causing immeasurable harm to our living environment. Currently, the energy crisis and the environmental problems are worsening worldwide, and car ownership is still increasing year by year, which further aggravates the above problems. Thus, there is an urgent need for the current automotive industry to seek a development approach for low noise, zero emissions and comprehensive utilization of energy, and to develop new energy vehicles different from traditional vehicles. Electric vehicles are the predominant form in the new energy vehicles and the electricity consumed thereby pertains to secondary energy and can be obtained in various ways, avoiding excessive consumption of primary energy. Moreover, electric vehicles also have advantages of good comfortability and cleanliness, less noise, no pollution, simple and reliable operation and low cost, so that they are called green cars and actually involve zero pollution and emission. Therefore, electric vehicles are inevitable products under a trend of sustainable development and are consistent with the ultimate concept of automobile development.

The electric vehicles can be divided into a concentrated motor driving form and an electrical-wheel driving form according to the way that the motor drives the wheels. For the vehicles driven by the concentrated motor, the power is transmitted to the driving wheels generally through a transmission, a differential mechanism, a universal driving device, etc., which leads to complicated structure and low transmission efficiency. In addition, the wheels fail to be independently controlled. However, in the vehicles driven by in-wheel motors, the motor can be directly provided on or near the driving wheels, which enables the driving system to have sample and compact structure, small space occupation, high transmission efficiency. Moreover, such arrangement ensures that respective electrical wheels can be independently controlled in dynamic. Thus, while achieving the energy conservation and environmental protection, the electrical vehicles driven by in-wheel motors also ensure the overall performance to the greatest extent, providing drivers with pleasure during the driving. Therefore, the electrical vehicles driven by in-wheel motors are one of the mainstream development trends of electric vehicles. The in-wheel motor-driving form can be mainly divided into wheel-side driving and hub-motor driving, where the wheel-side driving generally adopts an inner rotor motor as the power source and a speed reducer is provided between the inner rotor motor and wheels to reduce speed and increase torque with a constant speed ratio. While the hub-motor driving often adopts an outer rotor motor as the power source, where the outer rotor is fixedly connected to the wheels to directly drive the wheels with a transmission ratio of 1. Therefore, the conventional in-wheel motor-driving system, whether the wheel-side driving or hub-motor driving, only has a constant speed ratio, failing to reasonably adjust the speed ratio according to actual driving conditions to balance the requirements of the electrical vehicles driven by in-wheel motors for dynamics performance and driving economics. Therefore, considering the dynamics and economics, it is of great significance to develop a desired transmission to match the electrical vehicles driven by in-wheel motors.

SUMMARY OF THE INVENTION

An object of the invention is to provide a two-speed transmission system integrated with an inner rotor hub motor, which is provided with an inner rotor hub motor as a power source and two planetary gear trains for speed reduction and torque improvement. The invention adopts two electromagnetic brakes for gear shifting to allow drivers to switch a transmission among various gears according to actual driving conditions with rapid response and operation, overcoming the defects in the art that the electric vehicles driven by in-wheel motors are hard to balance the requirements for dynamics performance and driving economics.

The invention also provides an electric vehicle using the two-speed transmission system integrated with the inner rotor hub motor to meet the requirements for dynamics and economics and to achieve better overall performances. The two-speed transmission system integrated with the inner rotor hub motor realizes not only the gear shifting, but also the parking braking.

One of the technical solutions of the invention is described as follows.

The invention provides a two-speed transmission system integrated with an inner rotor hub motor, comprising:
a hub motor casing;
a motor shaft which is rotatably supported at a center of the hub motor casing, and an output end of the motor shaft extends out of the hub motor casing;
a first sun gear which is fixedly connected to the output end of the motor shaft;
a plurality of first planetary gears which are meshed with the first sun gear;
a first inner ring gear which is meshed with the first planetary gears and fixedly connected to the hub motor casing;
a first planetary carrier which is provided with a stepped hollow shaft and is rotatably supported on the motor shaft;
a first planetary carrier cover which is rotatably supported on the motor shaft and fixedly connected to the first planetary carrier;
a second sun gear which is fixedly connected to the first planetary carrier;

a plurality of second planetary gears which are meshed with the second sun gear;

a second inner ring gear which is meshed with the second planetary gears;

a second planetary carrier;

a second planetary carrier cover which is rotatably supported on the first planetary carrier and fixedly connected to the second planetary carrier;

a first electromagnetic brake casing;

a first excitation coil which is provided in the first annular groove;

a first magnet yoke;

a first spring which is provided in the first blind hole;

a second electromagnetic brake casing which is fixedly connected to the second planetary carrier, and is circumferentially and uniformly provided with a plurality of second blind holes;

a second excitation coil;

a second magnet yoke;

a second spring which is provided in the second blind hole; and a friction disk which is provided between the first magnet yoke and the second magnet yoke with clearance and fixedly connected to the second inner ring gear;

wherein:

the second inner ring gear is rotatably supported on the first electromagnetic brake casing; the first electromagnetic brake casing is circumferentially provided with a first annular groove; and a radially inner side of the first annular groove is circumferentially and uniformly provided with a first blind hole;

a space is provided between the first magnet yoke and the first excitation coil;

one end of the first spring abuts against a bottom of the first blind hole, and the other end of the first spring is fixedly connected to the first magnet yoke;

a space is provided between the second excitation coil and the second electromagnetic brake casing;

one end of the second spring abuts against a bottom of the second blind hole, and the other end of the second spring is fixedly connected to the second magnet yoke; and wherein the first excitation coil and the second excitation coil are selectively energized or de-energized to enable the friction disk to selectively press against the first magnet yoke or the second magnet yoke.

In some embodiments, the two-speed transmission system further comprises a transmission casing which comprises a first transmission casing and a second transmission casing; wherein the first transmission casing is fixedly connected to the second transmission casing, the hub motor casing and the first electromagnetic brake casing;

the second transmission casing is circumferentially provided with a second annular groove; the second excitation coil is provided in the second annular groove; and the second planetary carrier is rotatably supported on the second transmission casing.

In some embodiments, the two-speed transmission system further comprises a wheel hub which is fixedly connected to the second planetary carrier, a brake disc and a wheel rim which are respectively fixedly connected to the wheel hub, and a tire which is fixedly connected to the wheel rim.

In some embodiments, the two-speed transmission system further comprises a first bushing which is embedded into the first electromagnetic brake casing through the first magnet yoke, and a second bushing which is embedded into the second electromagnetic brake casing through the second magnet yoke.

In some embodiments, the two-speed transmission system further comprises a plurality of friction facings which are symmetrically mounted at both sides of the friction disk.

In some embodiments, the hub motor casing comprises a first casing and a second casing; the second casing is provided with a concave cavity; and the first sun gear, the first planetary gears, the first ring gear and the first planetary carrier cover are provided in the concave cavity; and the two-speed transmission system further comprises:

a stator casing which is fixedly provided between an end surface of the first casing and an end surface of the second casing;

a winding which is fixedly provided on the stator casing;

an inner rotor which is fixedly provided on the motor shaft; and a permanent magnet which is fixed on the inner rotor.

In some embodiments, the first planetary carrier axially limits the first sun gear via a protrusion formed on an end surface of the first sun gear;

the second planetary carrier axially limits the second sun gear via a protrusion formed on an end surface of the second sun gear; and the first electromagnetic brake casing axially limits the second inner ring gear via a washer.

In some embodiments, the two-speed transmission system further comprises a steering knuckle which is fixedly connected to the hub motor casing and is fixedly connected to a vehicle body by a suspension, and a brake caliper which is fixedly connected to the steering knuckle.

In some embodiments, a first cylindrical shaft is provided at two sides of respective first planetary gears;

the first planetary carrier and the first planetary carrier cover each are provided with a first outer radial circular hole;

the first cylindrical shaft is provided to extend into the first outer radial circular holes of the first planetary carrier and the first planetary carrier cover;

a second cylindrical shaft is provided at two sides of respective second planetary gears;

the second planetary carrier and the second planetary carrier cover each are provided with a second outer radial circular hole;

wherein the second cylindrical shaft fits in the second outer radial circular holes of the second planetary carrier and the second planetary carrier cover.

The invention further provides an electric vehicle using the two-speed transmission system integrated with the inner rotor hub motor.

Compared to the prior art, the invention has the following beneficial effects.

1. The two-speed transmission system integrated with an inner rotor hub motor provided herein has simple structure and compact and reasonable arrangement, and is suitable to be arranged in or near the wheels. Moreover, the first planetary gear train is mounted in the concave cavity of the right motor casing, which has small space occupation, reducing the axial size of the entire transmission system.

2. The two electromagnetic brakes in this invention share a friction disk, which reduces the number of parts and components, achieving a highly-integrated structure.

3. In the two-speed transmission system provided herein, the gear shifting can be automatically completed only by controlling the on-off state of the two electromagnetic brakes. In addition, the gear shifting process only costs dozens of milliseconds, showing a good response.

4. In the use of a dead electromagnetic brake, this invention enables not only the gear shifting, but also the long-term no-power parking braking, thereby meeting various needs of automobiles by a wide variety of working modes.

DETAILED DESCRIPTION OF EMBODIMENTS

The present invention will be further described in detail below with reference to the accompanying drawings to enable those skilled in the art to fully understand the technical solutions of the invention.

Figure 1:
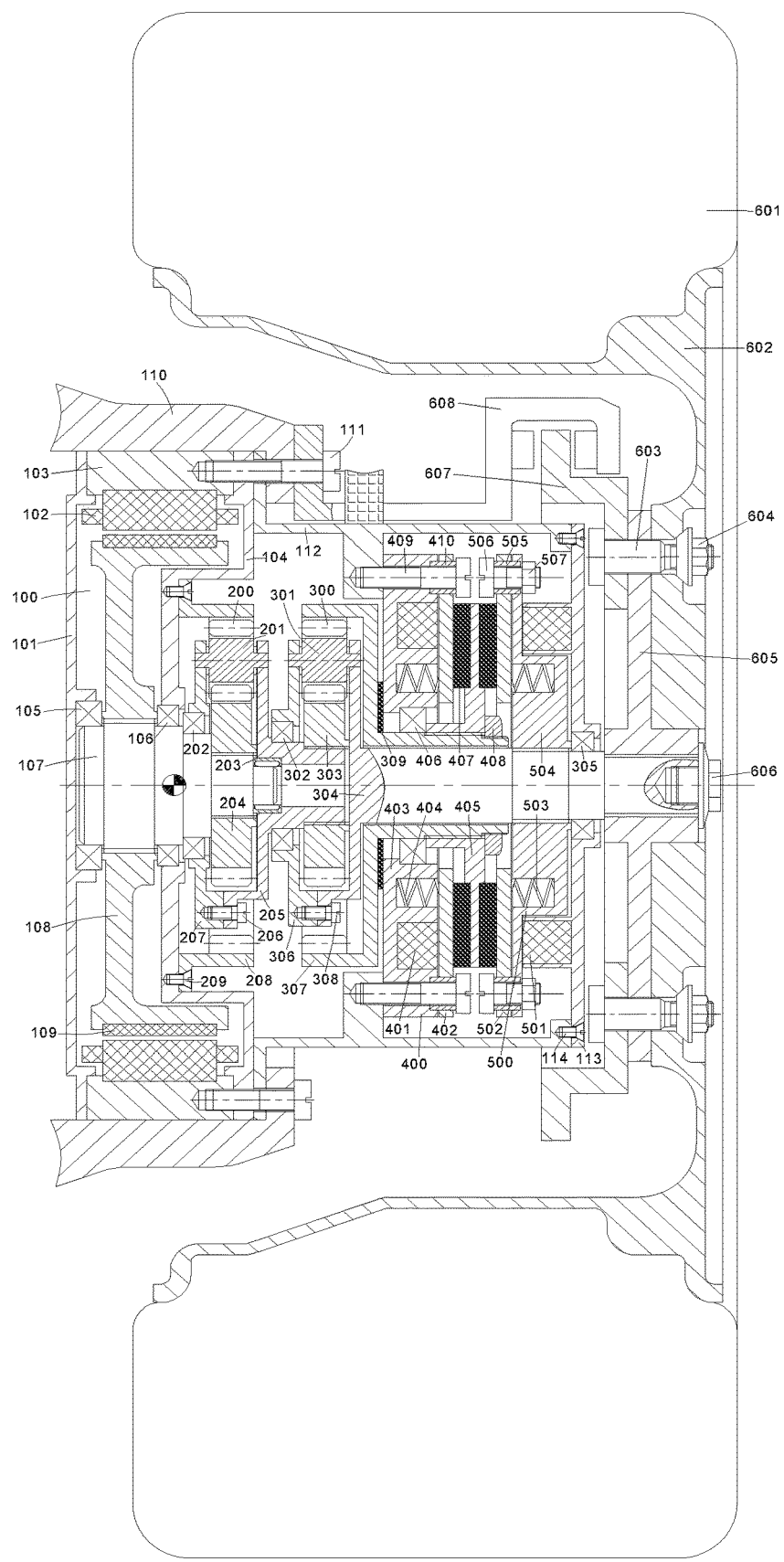
FIG. 1 is a schematic view of a two-speed transmission system integrated with an inner rotor hub motor according to the invention.

This invention provides a two-speed transmission system integrated with an inner rotor hub motor as shown in FIG. 1, which includes an inner rotor hub motor as a power source, two planetary gear trains for speed reduction and torque improvement and two electromagnetic brakes for gear shifting. Thus, the transmission can be switched among various gears to adapt to actual driving conditions of the electric vehicles. In addition, due to the rapid response, the gear shifting process is completed in a extremely short time, achieving better dynamics and economics and improving overall performances of the electric vehicles. The two-speed transmission system enables not only the gear shifting, but also the parking braking.

The two-speed transmission system integrated with the inner rotor hub motor of this invention mainly includes the inner rotor hub motor 100, a steering knuckle 110, a first transmission casing 112, a second transmission casing 113, a first planetary gear train 200, a second planetary gear train 300, a first electromagnetic brake 400, a second electromagnetic brake 500, a tire 601, a wheel rim 602, a wheel hub 605, a brake disc 607 and a brake caliper 608.

The inner rotor hub motor 100 includes a first casing 101, a winding 102, a stator casing 103, a second casing 104, a first bearing 105, a second bearing 106, a motor shaft 107, an inner rotor 108 and a permanent magnet 109.

The stator casing 103 is fixedly clamped in an end surface ring groove between the first casing 101 and the second casing 104. The stator casing, the first casing and the second casing are fixedly connected. The winding 102 is fixed on the stator casing 103. A middle portion of the second casing 104 is recessed towards left to form a concave cavity. A fastening screw 111 is fixedly connected to the stator casing 103, the second casing 104, the first transmission casing 112, the brake caliper 608 and the steering knuckle 110 together. A screw 114 is fixedly connected to the second transmission casing 113 and the first transmission casing 112. The steering knuckle 110 is fixedly connected to a vehicle body by a suspension to be stationary. Therefore, the first casing 101, the stator casing 103, the second casing 104, the first transmission casing 112, the second transmission casing 113 and the brake caliper 608 are fixed to be stationary. The second transmission casing 113 is provided with an annular groove with an opening towards the left. The first casing 101 and the second casing 104 support the motor shaft 107 through the first bearing 105 and the second bearing 106, respectively. The inner rotor 108 is splined to the motor shaft 107. The permanent magnet 109 is fixed on the inner rotor 108. The first bearing 105 is axially limited by the inner rotor 108 which is axially limited by the second bearings 106. The second bearing 106 is axially limited by the second casing 104.

The first planetary gear train 200 is a single-row single-stage planetary gear train and locates in the concave cavity of the second casing 104. The first planetary gear train 200 includes a plurality of first planetary gears 201, a third bearing 202, a needle roller bearing 203, a first sun gear 204, a first planetary carrier 205, a first planetary carrier fastening screw 206, a first planetary carrier cover 207, a first inner ring gear 208 and a ring gear screw 209.

The first sun gear 204 is splined to the motor shaft 107. A left end surface of the first sun gear 204 is in contact with a shaft shoulder end surface of the motor shaft 107, and a right end surface of the first sun gear 204 is provided with a protrusion to contact with the first planetary carrier 205, thereby axially limiting the first sun gear 204. A first cylindrical shaft protrudes from two sides of each first planetary gear 201 and extends into first outer radial circular holes of the first planetary carrier 205 and the first planetary carrier cover 207. The first cylindrical shaft is freely rotatable. The first planetary carrier 205 and the first planetary carrier cover 207 are fixedly connected by the first planetary carrier fastening screw 206. The first planetary carrier 205 extends to the right to form a stepped hollow shaft, which is supported on the motor shaft 107 by the needle roller bearing 203 and axially limits the needle bearing 203 by a shaft shoulder of the motor shaft 107. The first planetary carrier cover 207 is supported on the motor shaft 107 by the third bearing 202 and axially limits the third bearing by the shaft shoulder of the motor shaft 107. The first inner ring gear 208 is fixedly connected to the second casing 104 via the ring gear screw 209.

In this embodiment, a planetary row characteristic parameter of the first planetary gear train 200 is preferably greater than 1, where the planetary row characteristic parameter is defined as generally understood in the mechanical art, which refers to a ratio of tooth number of the inner ring gear to that of the sun gear in the planetary gear train.

The second planetary gear train 300 is a single-row single-stage planetary gear train and is provided at a right side of the first planetary gear train 200. The second planetary gear train 300 includes a plurality of second planetary gears 301, a fourth bearing 302, a second sun gear 303, a second planetary carrier 304, a fifth bearing 305, a second planetary carrier cover 306, a second inner ring gear 307, a second planetary carrier fastening screw 308 and a washer 309;

where the second sun gear 303 is splined to the hollow shaft of the first planetary carrier 205. A left end surface of the second sun gear 303 is in contact with an end surface of a shaft shoulder of the hollow shaft. A right side of the second sun gear 303 is provided with a protrusion to contact with the second planetary carrier 304, thereby axially limiting the second sun gear 303. A second cylindrical shaft protrudes from two sides of each second planetary gear 301 and extends into second outer radial circular holes of the second planetary carrier 304 and the second planetary carrier cover 306. The second cylindrical shaft is freely rotatable. The second planetary carrier 304 and the second planetary carrier cover 306 are fixedly connected by the second planetary carrier fastening screw 308. The second planetary carrier 304 extends to the right to form a stepped solid shaft, which is supported on the second transmission casing 113 by the fifth bearing 350. The second transmission casing 113 axially limits the fifth bearing. The second carrier cover 306 is supported by the fourth bearing 302 on the hollow shaft of the first planetary carrier and axially limits the fourth bearing 302 by the shaft shoulder of the hollow shaft of the first planetary carrier 205. The second ring gear 307 extends to the right to form a hollow shaft. A solid shaft of the second planetary carrier 304 passes through the hollow shaft of the second inner ring gear 307 from left to right without contact.

In this embodiment, a planetary row characteristic parameter of the second planetary gear train 300 is preferably greater than 1.

The first electromagnetic brake 400 is provided on a right side of the second planetary gear train 300 and includes a first excitation coil 401, a first magnet yoke 402, a first electromagnetic brake casing 403, a plurality of first springs 404 circumferentially and uniformly distributed, a friction disk 405, a sixth bearing 406, a plurality of friction facings 407, a round nut 408, a plurality of first electromagnetic brake screws 409 circumferentially and uniformly distributed and a first bushing 410 matched with each first electromagnetic brake screw 409.

The first electromagnetic brake casing 403 supports the hollow shaft of the second inner ring gear 307 via the sixth bearing 406. The washer 309 is provided between the second inner ring gear 307 and the first electromagnetic brake casing 403 to axially limit the second inner ring gear 307. A set of first excitation coils 401 is wound in an annular groove of the first electromagnetic brake casing 403. A space is provided between the first excitation coil 401 and the first magnet yoke 402. A radial inner side of the annular groove of the first electromagnetic brake casing 403 is opened with a plurality of first blind holes circumferentially and uniformly distributed. Each first spring 404 is provided in each first blind hole, and one end of the first spring 404 is embedded in a bottom of the first blind hole, and the other end thereof is bonded to an end surface of the first magnet yoke 402. The annular groove and the blind holes of the first electromagnetic brake casing 403 are opened towards the right. The first bushing 410 is embedded in the first electromagnetic brake casing 403 through the first magnet yoke 402. Each first electromagnetic brake screw 409 passes through the first bushing 410 and the first electromagnetic brake casing 403 and is screwed into the first transmission casing 112, so as to fixedly connect the first magnet yoke 402, the first electromagnetic brake casing 403 and the first transmission casing 112. The first magnet yoke 402 can move axially along the first bushing 410. The first bushing 410 can protect the first electromagnetic brake screws 409 from being worn during the axial movement of the first magnet yoke 402 and maintain a minimum air gap between the first excitation coil 401 and the first magnet yoke 402. The friction disk 405 extends to the left to form a hollow shaft, is splined to the hollow shaft of the second inner ring gear 307 and axially limits the sixth bearing 406. Two friction facings 407 are respectively mounted at left and right sides of the friction disk 405. The round nut 408 is threadedly connected to a right end of the hollow shaft of the second inner ring gear 307 to axially limit the friction disk 405, thereby integrally and fixedly connecting the friction disk 405 and the second inner ring gear 307.

The second electromagnetic brake 500 is provided on a right side of the first electromagnetic brake 400 and includes a second excitation coil 501, a second magnet yoke 502, a plurality of second springs 503 circumferentially and uniformly distributed, a second electromagnetic brake casing 504, a plurality of second electromagnetic brake screws 506 circumferentially and uniformly distributed, a second bushing 505 matched with each second electromagnetic brake screw 506 and a nut 507.

The friction disk 405 is provided between the first magnet yoke 402 and the second magnet yoke 502. The first electromagnetic brake 400 and the second electromagnetic brake 500 share the friction disk 405. The second electromagnetic brake casing 504 is splined to the solid shaft of the second planetary carrier 304 and axially limits the second electromagnetic brake casing 504 via the fifth bearing 305. A set of second excitation coils 501 is wound in an annular groove of the second transmission casing 113. A space is provided between the second excitation coil 501 and the second electromagnetic brake casing 504. The second electromagnetic brake casing 504 is opened with a plurality of second blind holes to the left circumferentially and uniformly distributed. Each second spring 503 is provided in each second blind hole, and one end of the second spring 503 is embedded in a bottom of the second blind hole, and the other end thereof is bonded to an end surface of the second magnet yoke 502. The second bushing 505 is embedded into the second electromagnetic brake casing 504 through the second magnet yoke 502. Each second electromagnetic brake screw 506 passes through the second bushing 505 and is fixedly connected to the second magnet yoke 502 and the second electromagnetic brake casing 504 via the nut 507. The second magnet yoke 502 can move axially along the second bushing 505. The second bushing 505 can protect the second electromagnetic brake screw 506 from being worn during the axial movement of the second magnet yoke 502.

A right end of the solid shaft of the second planetary carrier 304 is provided with an external spline and is splined to an inner hole of the wheel hub 605. A hollow shaft of the wheel hub 605 extends into a central hole of the wheel rim 602. A rim bolt 603 and a rim nut 604 are provided to fixedly connect the wheel hub 605, the brake disc and the wheel rim 602. The wheel rim 602 is fixedly connected to the tire 601. A right end of the solid shaft of the second planetary carrier 304 is machined with a threaded hole, to which a shaft end bolt 606 is screwed. A left end surface of the shaft end bolt 606 is in contact with a right end surface of the wheel hub 605 to axially fix the wheel hub 605.

During the assembly of this invention, the inner rotor hub motor 100, the first transmission casing 112, the second transmission casing 113, the screw 114, the first planetary gear train 200, the second planetary gear train 300, the first electromagnetic brake 400 and the second electromagnetic brake 500 are used as a power assembly, which is fixedly connected to the steering knuckle 110 and the brake caliper 608 via the fastening screw 111, and is fixedly connected to the wheel rim 602 and the wheel hub 605 via the solid shaft of the second planetary carrier 304, where the solid shaft extends towards right.

Figure 2:
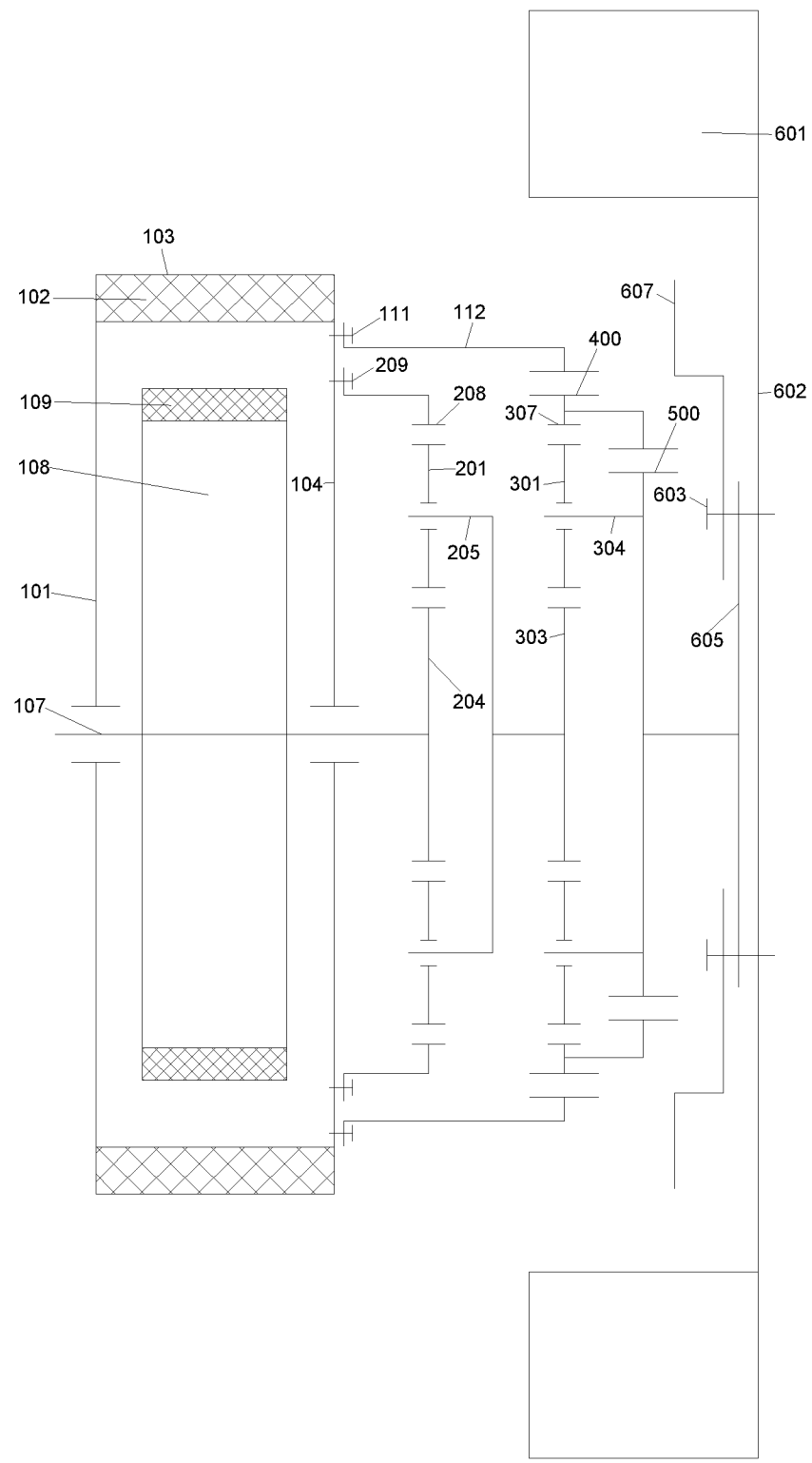
FIG. 2 is a simplified diagram showing the structure of the two-speed transmission system integrated with the inner rotor hub motor according to the present invention.

The main connection relationship of the two-speed transmission system integrated with the inner rotor hub motor is schematically shown in FIG. 2. It can be further concluded that there are a total of four working modes for the transmission system of the invention, including: forward one-gear state, forward two-gear state, reverse state and parking braking state.

The working principles of the four modes will be respectively described below. For a clear description, a direction in which the wheels rotate to enable the electric vehicles to move forward is defined as positive direction, and a direction in which the wheels rotates to enable the electric vehicles to move backward is defined as negative direction.

1. When the electric vehicle is in the forward one-gear state, that is, the first excitation coil 401 is powered off and the second excitation coil 501 is energized, at this time, the second excitation coil 501 attracts the second magnet yoke 502 to move axially along the second bushing 505, eliminating a pressing force between the magnet yoke 502 and the friction disk 405. The first magnet yoke 402 is pressed towards the friction disk 405 under the action of the first spring 404 to connect to the friction disk 405. The friction disk 405 is fixed, so that the second inner ring gear 307 is fixed. The inner rotor hub motor 100 outputs positive torque, and the motor shaft 107 and the inner rotor 108 synchronously and positively rotates. A rotational speed of the motor shaft 107 is set to n, so a rotational speed of the first sun gear 204 is n. Since the first inner ring gear 208 is fixed with a rotational speed of 0, a rotational speed of the first planetary carrier 205 is obtained as $$\frac{1}{k_1+1}n$$

according to a rotational speed formula of the single-row single-stage planetary gear train (where $k_1$ is a planetary row characteristic parameter of the first planetary gear train 200, and greater than 1), so a rotational speed of the second sun gear 303 is $$\frac{1}{k_1+1}n.$$

Further, since the second inner ring gear 307 is fixed with a rotational speed of 0, the rotational speed of the second planetary carrier 304 is obtained as $$\frac{1}{(k_1+1)(k_2+1)}n$$

according to the rotational speed formula of the single-row single-stage planetary gear train (where $k_2$ is a planetary row characteristic parameter of the second planetary gear train 300, and greater than 1). Thus, the wheel hub 605, the wheel rim 602 and the tire 601 share a rotational speed of $$\frac{1}{(k_1+1)(k_2+1)}n.$$

Figure 3:
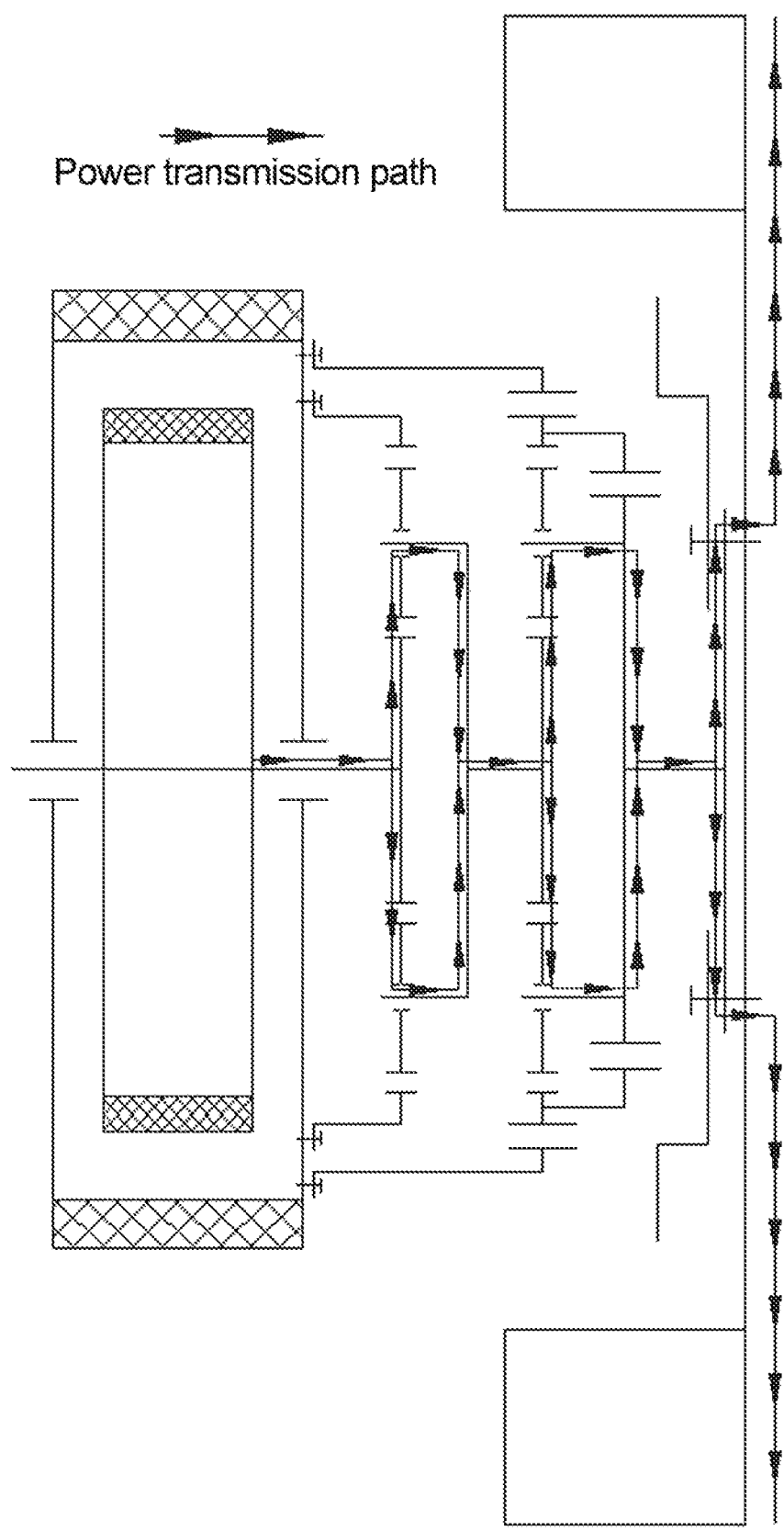
FIG. 3 schematically shows a power transmission path of the two-speed transmission system integrated with the inner rotor hub motor in a forward one-gear state according to the invention.

Therefore, as shown in FIG. 3, when the electric vehicle is in the forward one-gear state, the power is transmitted sequentially through the motor shaft 107, the first sun gear 204, the plurality of first planetary gears 201, the first planetary carrier 205, the second sun gear 303, the plurality of second planetary gears 301, the second planetary carrier 304, the wheel hub 605, the rim bolt 603 and the wheel rim 602 to the tire 601, thereby driving the electric vehicles to drive forward. At this time, a one-gear transmission ratio of the two-speed transmission system integrated with the inner rotor hub motor is $(k_1+1)(k_2+1)$.

2. When the electric vehicle is switched to the forward two-gear state from the forward one-gear state, that is, the first excitation coil 401 is energized and the second excitation coil 501 is powered off, at this time, the first excitation coil 401 attracts the first magnet yoke 402 to move axially along the first bushing 410, eliminating a pressing force between the first magnet yoke 402 and the friction disk 405. The second magnet yoke 502 is pressed towards the friction disk 405 under the action of the second spring 503 to connect to the friction disk 405. The friction disk 405 is fixedly connected to the second electromagnetic brake casing 504, so that the second inner ring gear 307 is fixedly connected to the second planetary carrier 304. The inner rotor hub motor 100 outputs positive torque, and the motor shaft 107 and the inner rotor 108 synchronously and positively rotate, and at this time, a rotational speed of the motor shaft 107 is set to n, so a rotational speed of the first sun gear 204 is n. Since the first inner ring gear 208 is fixed with a rotational speed of 0, a rotational speed of the first planetary carrier 205 is obtained as $$\frac{1}{k_1+1}n$$

according to a rotational speed formula of the single-row single-stage planetary gear train, so a rotational speed of the second sun gear 303 is $$\frac{1}{k_1+1}n.$$

Further, since the second inner ring gear 307 is fixedly connected to the second planetary carrier 304 with the same rotational speed, the second inner ring gear 307, the second planetary carrier 304 and the second sun gear 303 have the same rotational speed of $$\frac{1}{k_1+1}n$$

according to the rotational speed formula of the single-row single-stage planetary gear train, thus, the wheel hub 605, the wheel rim 602 and the tire 601 share a rotational speed of $$\frac{1}{k_1+1}n.$$

Figure 4:
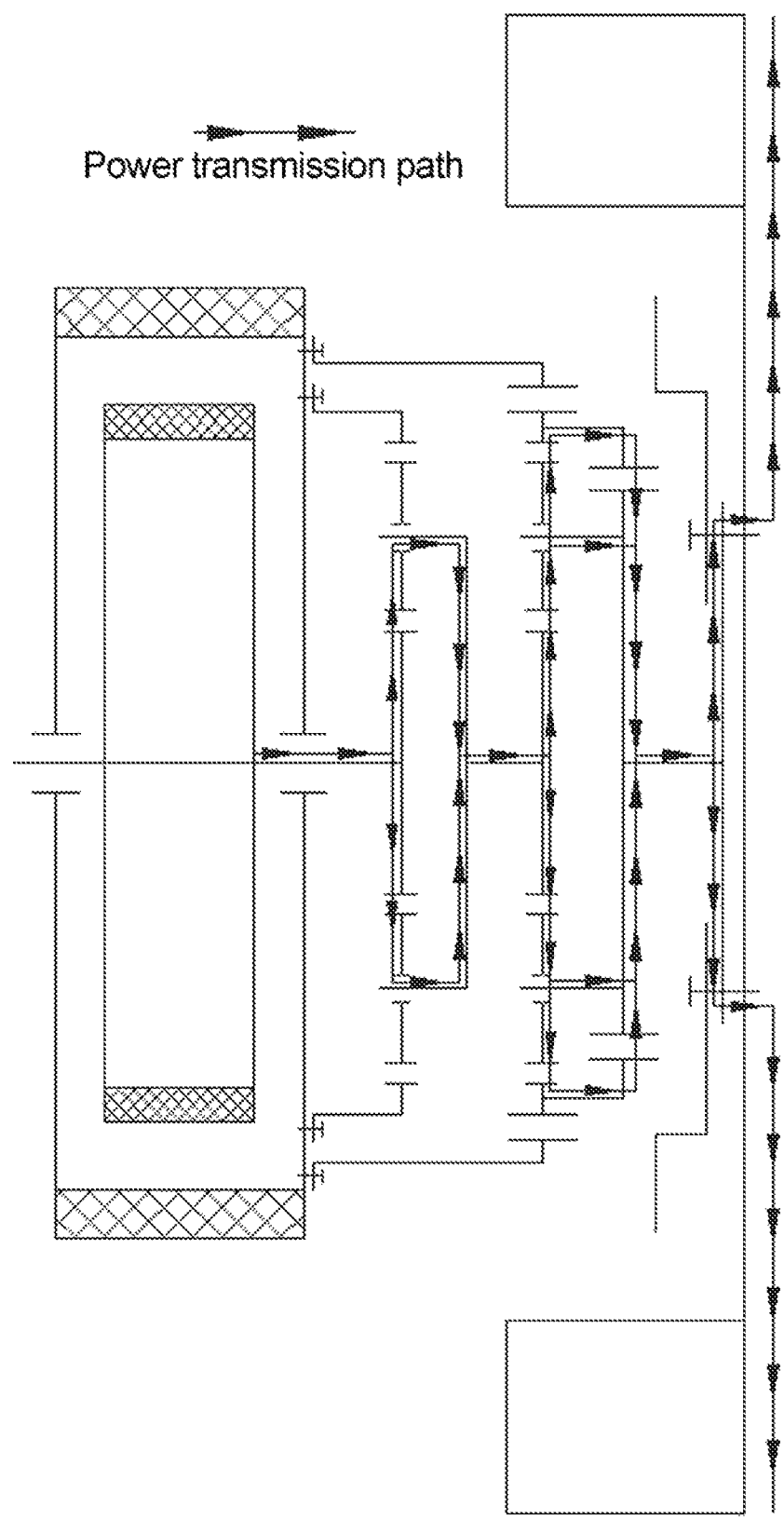
FIG. 4 schematically shows a power transmission path of the two-speed transmission system integrated with the inner rotor hub motor in a forward two-gear state according to the invention.

Therefore, as shown in FIG. 4, when the electric vehicle is in the forward two-gear state, the power is transmitted sequentially through the motor shaft 107, the first sun gear 204, the plurality of first planetary gears 201, the first planetary carrier 205, the second sun gear 303, the plurality of second planetary gears 301, the second inner ring gear 307, the second planetary carrier 304, the wheel hub 605, the rim bolt 603 and the wheel rim 602 to the tire 601, thereby driving the electric vehicles to drive forward. At this time, a two-gear transmission ratio of the two-speed transmission system integrated with the inner rotor hub motor is $(k_1+1)$.

3. When the electric vehicle is in the reverse state, it is only required to control the inner rotor hub motor 100 to output negative torque to reversely rotate the motor shaft 107. The rest of the working principle is exactly the same as that for the forward one-gear state and the forward two-gear state, and thus it is not repeated herein anymore.

4. When the electric vehicle is stopped and held in a parking braking state, it is only required to power off the first excitation coil 401 and the second excitation coil 501 due to the use of a dead electromagnetic brake. At this time, the first magnet yoke 402 is driven to press towards the friction disk 405 under the action of the first spring 404 to connect to the friction disk 405. The friction disk 405 is fixed, and the second inner ring gear 307 is fixed. The second magnet yoke 502 is also pressed toward the friction disk 405 under the action of the second spring 503 to connect the friction disk 405. Thus the second magnet yoke 502 is also fixed to stop the second electromagnetic brake casing 504 from rotating and to further stop the second planetary carrier 304 from rotating, thereby stopping the wheel hub 605, the wheel rim 602 and the tire 601 from rotating. In this way, a long-term parking brake is realized without additional energy consumption after the vehicle is powered off.

Described above are merely preferred embodiments of the invention, which are not intended to limit the invention, and the technical solutions of the invention can also be fully applied to various suitable fields. Any modifications be made by those skilled in the art without departing from the spirit of the invention should fall within the scope of the invention defined by the appended claims.

What is claimed is:

1. 1. A two-speed transmission system integrated with an inner rotor hub motor, comprising:
    a hub motor casing;
    a motor shaft which is rotatably supported at a center of the hub motor casing, and an output end of the motor shaft extends out of the hub motor casing;
    a first sun gear which is fixedly connected to the output end of the motor shaft;
    a plurality of first planetary gears which are meshed with the first sun gear;
    a first inner ring gear which is meshed with the first planetary gears and fixedly connected to the hub motor casing;
    a first planetary carrier which is provided with a stepped hollow shaft and is rotatably supported on the motor shaft;
    a first planetary carrier cover which is rotatably supported on the motor shaft and fixedly connected to the first planetary carrier;
    a second sun gear which is fixedly connected to the first planetary carrier;
    a plurality of second planetary gears which are meshed with the second sun gear;
    a second inner ring gear which is meshed with the second planetary gears;
    a second planetary carrier;
    a second planetary carrier cover which is rotatably supported on the first planetary carrier and fixedly connected to the second planetary carrier;
    a first electromagnetic brake casing;
    a first excitation coil which is provided in a first annular groove;
    a first magnet yoke;
    a first spring which is provided in a first blind hole;
    a second electromagnetic brake casing which is fixedly connected to the second planetary carrier, and is circumferentially and uniformly provided with a plurality of second blind holes;
    a second excitation coil;
    a second magnet yoke;
    a second spring which is provided in the second blind hole; and
    a friction disk which is provided between the first magnet yoke and the second magnet yoke with clearance and fixedly connected to the second inner ring gear;
    wherein:
    the second inner ring gear is rotatably supported on the first electromagnetic brake casing; the first electromagnetic brake casing is circumferentially provided with the first annular groove; and a radially inner side of the first annular groove is circumferentially and uniformly provided with the first blind hole;
    a space is provided between the first magnet yoke and the first excitation coil;
    one end of the first spring abuts against a bottom of the first blind hole, and the other end of the first spring is fixedly connected to the first magnet yoke;
    a space is provided between the second excitation coil and the second electromagnetic brake casing;
    one end of the second spring abuts against a bottom of the second blind hole, and the other end of the second spring is fixedly connected to the second magnet yoke; and
    wherein the first excitation coil and the second excitation coil are selectively energized or de-energized to enable the friction disk to selectively press against the first magnet yoke or the second magnet yoke.

2. The two-speed transmission system of claim 1, further comprising:
    a transmission casing which comprises a first transmission casing and a second transmission casing;
    wherein the first transmission casing is fixedly connected to the second transmission casing, the hub motor casing and the first electromagnetic brake casing; the second transmission casing is circumferentially provided with a second annular groove; the second excitation coil is provided in the second annular groove; and the second planetary carrier is rotatably supported on the second transmission casing.

3. The two-speed transmission system of claim 2, further comprising:
    a wheel hub which is fixedly connected to the second planetary carrier;
    a brake disc and a wheel rim which are respectively fixedly connected to the wheel hub;
    a tire which is fixedly connected to the wheel rim.

4. The two-speed transmission system of claim 3, further comprising:
    a first bushing which is embedded into the first electromagnetic brake casing through the first magnet yoke; and
    a second bushing which is embedded into the second electromagnetic brake casing through the second magnet yoke.

5. The two-speed transmission system of claim 4, further comprising:
    a plurality of friction facings which are symmetrically mounted at both sides of the friction disk.

6. The two-speed transmission system of claim 1, wherein the hub motor casing comprises a first casing and a second casing; the second casing is provided with a concave cavity; and the first sun gear, the first planetary gears, the first ring gear and the first planetary carrier cover are provided in the concave cavity; and
    the two-speed transmission system further comprises:

a stator casing which is fixedly provided between an end surface of the first casing and an end surface of the second casing;

a winding which is fixedly provided on the stator casing;

an inner rotor which is fixedly provided on the motor shaft; and a permanent magnet which is fixed on the inner rotor.

7. The two-speed transmission system of claim 6, wherein the first planetary carrier axially limits the first sun gear via a protrusion formed on an end surface of the first sun gear;

the second planetary carrier axially limits the second sun gear via a protrusion formed on an end surface of the second sun gear; and the first electromagnetic brake casing axially limits the second inner ring gear via a washer.

8. The two-speed transmission system of claim 7, further comprising:

a steering knuckle which is fixedly connected to the hub motor casing and is fixedly connected to a vehicle body by a suspension; and a brake caliper which is fixedly connected to the steering knuckle.

9. The two-speed transmission system of claim 8, wherein a first cylindrical shaft is provided at two sides of respective first planetary gears;

the first planetary carrier and the first planetary carrier cover each are provided with a first outer radial circular hole;

the first cylindrical shaft fits in extend into the first outer radial circular holes of the first planetary carrier and the first planetary carrier cover;

a second cylindrical shaft is provided at two sides of respective second planetary gears;

the second planetary carrier and the second planetary carrier cover each are provided with a second outer radial circular hole;

wherein the second cylindrical shaft fits in the second outer radial circular holes of the second planetary carrier and the second planetary carrier cover.

10. An electric vehicle using the two-speed transmission system of claim 1.

* * * * *